United States Patent [19]

von Kaler

[11] 4,224,839
[45] Sep. 30, 1980

[54] DUAL RANGE TRANSAXLE TRANSMISSION

[75] Inventor: Roland L. von Kaler, Tecumseh, Mich.

[73] Assignee: Tecumseh Products Company, Tecumseh, Mich.

[21] Appl. No.: 894,548

[22] Filed: Apr. 7, 1978

[51] Int. Cl.² .................. F16H 37/08; B60K 41/04
[52] U.S. Cl. ............................... 74/701; 74/713; 74/745; 74/850
[58] Field of Search .......... 74/694, 700, 701, 740, 74/745, 713, 850; 180/70 MS, 75

[56] References Cited

U.S. PATENT DOCUMENTS

| | | | |
|---|---|---|---|
| 2,718,271 | 9/1955 | Jedrzykowski | 180/70 |
| 2,791,912 | 5/1957 | Bixby | 74/740 |
| 2,838,940 | 6/1958 | Swenson et al. | 74/700 |
| 3,040,601 | 6/1962 | Lewis | 74/740 |
| 3,115,048 | 12/1963 | Cape | 74/700 |
| 4,103,566 | 8/1978 | von Kaler et al. | 74/701 |

FOREIGN PATENT DOCUMENTS

| | | | |
|---|---|---|---|
| 577802 | 6/1959 | Canada | 74/701 |
| 892717 | 10/1953 | Fed. Rep. of Germany | 74/700 |
| 10347 | of 1911 | United Kingdom | 74/701 |
| 1100333 | 1/1968 | United Kingdom | 74/701 |

*Primary Examiner*—Allan D. Herrmann
*Attorney, Agent, or Firm*—Albert L. Jeffers; Robert G. Irish

[57] ABSTRACT

A transaxle transmission includes a casing with axially aligned output shaft extensions extending through end walls thereof. An input shaft extends through a casing side wall and is generally perpendicular with respect to the output shaft. Selectively actuable change speed gearing is drivingly connected to the output shaft for selectively providing predetermined forward and reverse gear ratios, and a manually actuable element is coupled to the change speed gearing for shifting the same. An intermediate shaft is provided in spaced, parallel relationship with the input shaft and is drivingly connected to the change speed gearing. Second selectively actuable change speed gearing drivingly connects the input shaft to the intermediate shaft to provide high and low speed reduction ratios between the input and intermediate shafts, and another manually actuable element is coupled to the second change speed gearing for shifting the same.

3 Claims, 5 Drawing Figures

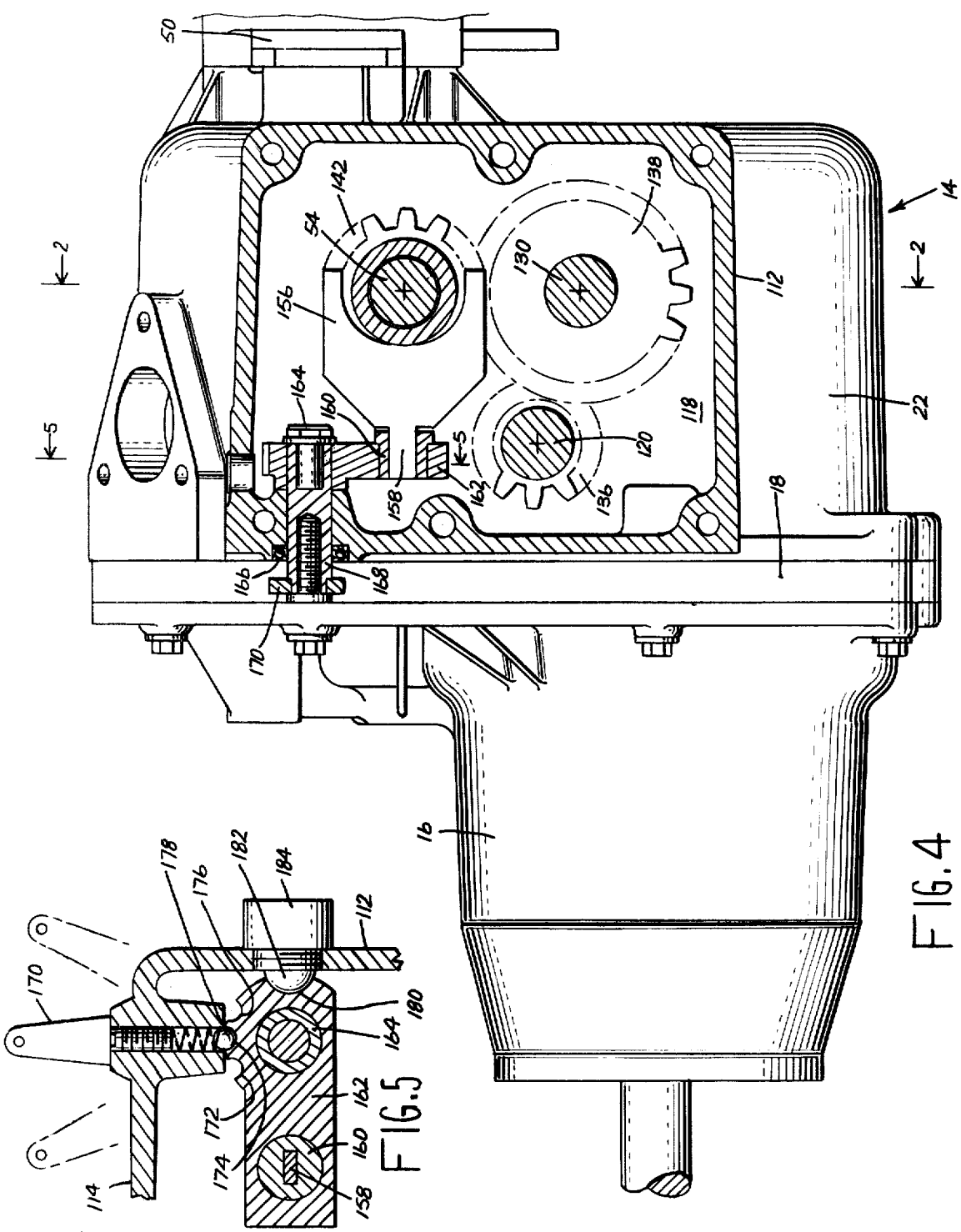

DUAL RANGE TRANSAXLE TRANSMISSION

BACKGROUND OF THE INVENTION

1. Field of the Invention

This invention relates generally to transaxle transmissions, and more particularly to a dual range transaxle transmission.

2. Description of the Prior Art

A transaxle transmission conventionally includes a multi-ratio gear train and an axle, with or without a differential, in one package; such transaxle transmissions are commonly employed in small wheeled vehicles, such as garden tractors and the like. In the past, a small number of gear ratios, such as three forward and one reverse, has been sufficient since the tire sizes on garden tractors were small. More recently, however, garden tractors have grown larger and become more sophisticated with larger engines and larger tires which, in turn, has required a larger range of speed reduction ratios for example, several lower speeds for tilling, ground preparation, snow removal and the like, several higher speeds for lawn moving, sweeping, and transportation, and at least lower and higher speeds in reverse.

The assignee of the present application has manufactured a single rate transaxle transmission in which a vertically disposed input shaft is coupled by change speed gearing to the cage of differential connected to axially aligned output shafts. It is desirable to modify such a single range transaxle transmission to provide dual range operation so that maximum use can be made of interchangeable parts.

SUMMARY OF THE INVENTION

In its broader aspects, the invention provides a dual range transaxle transmission including a casing having side and opposite end walls. Output shaft means is provided having axially aligned extensions respectively extending through the casing end walls. An input shaft extends through the casing side wall generally perpendicular with respect to the output shaft means. First selectively actuable change speed gearing means is provided in the casing drivingly connected to the output shaft means for selectively providing predetermined forward and reverse gear ratios, and manually actuable means is coupled to the gearing means for shifting the same to provide the predetermined ratios. At least one intermediate shaft is provided in the casing in spaced, parallel relationship with the input shaft, and means is provided for drivingly connecting the intermediate shaft to the first gearing means. Gearing means are provided in the casing for drivingly connecting the input shaft to the intermediate shaft thereby to provide high and low speed reduction ratios between the input and intermediate shafts, and second manually actuable means is provided coupled to the second change speed gearing means for shifting the same to provide the high and low speed ratios.

It is accordingly an object of the present invention to provide an improved transaxle transmission.

Another object of the invention is to provide a dual range transaxle transmission.

Yet another object of the invention is to modify a conventional single range transaxle transmission for dual range operation.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is a top, cross-sectional view taken generally along the line 4—4 of FIG. 2; and FIG. 5 is a fragmentary, cross-sectional view taken generally along the line 5—5 of FIG. 4.

DESCRIPTION OF THE PREFERRED EMBODIMENT

Figure 1:
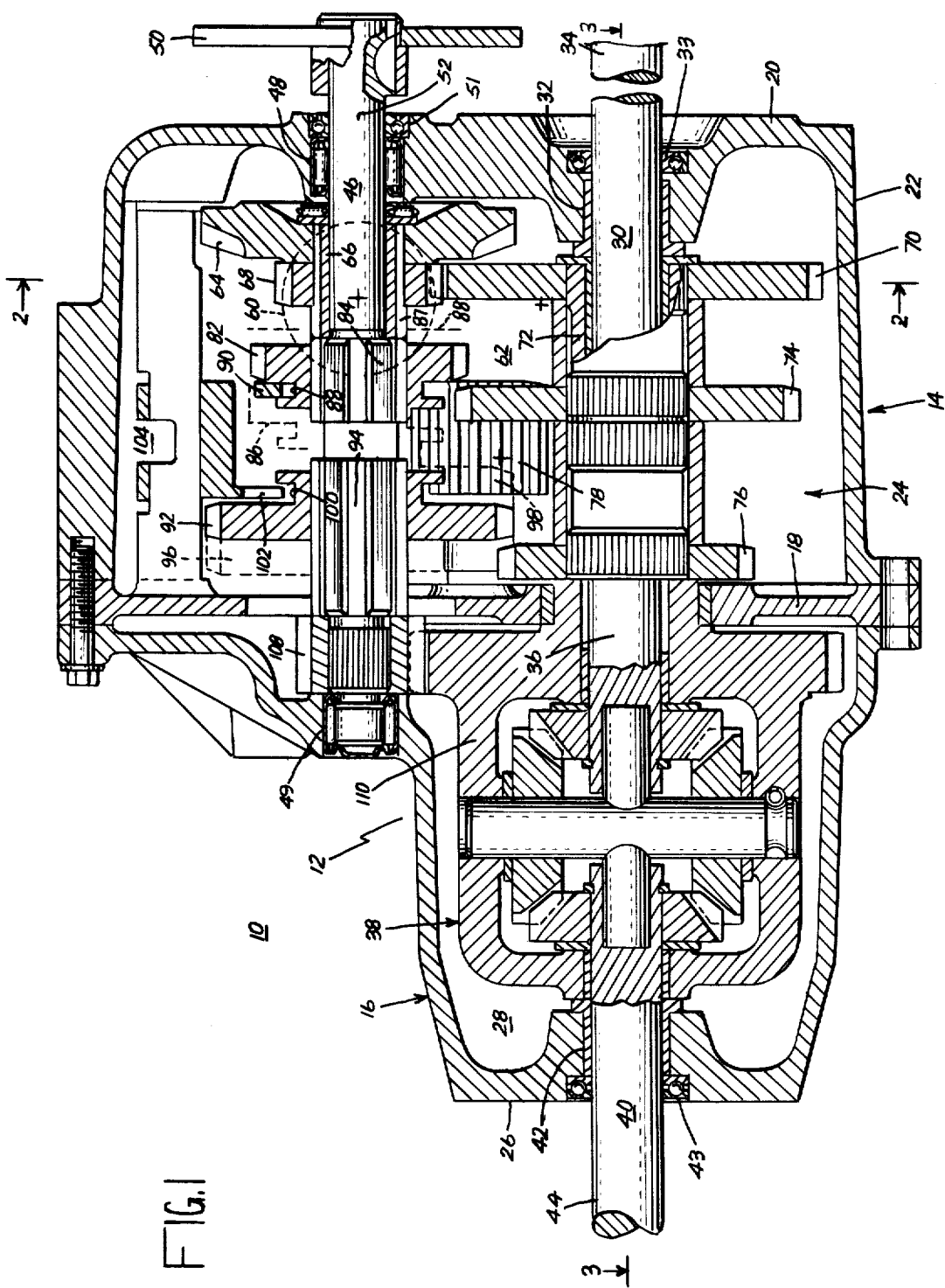
FIG. 1 is a top, cross-sectional view showing the improved dual range transaxle transmission of the invention.
Figure 2:
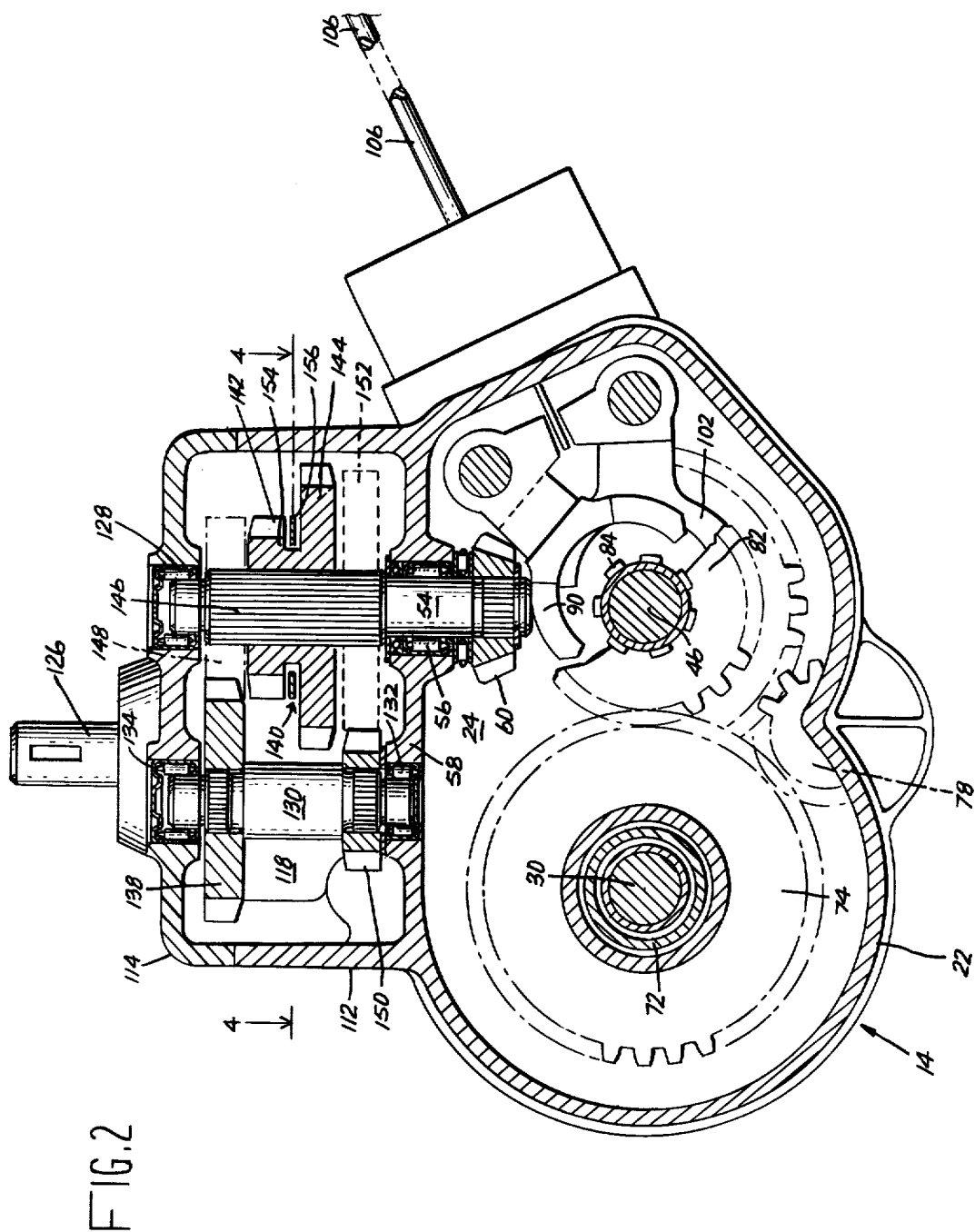
FIG. 2 is a side, cross-sectional view taken generally along the line 2—2 of FIG. 1.
Figure 3:
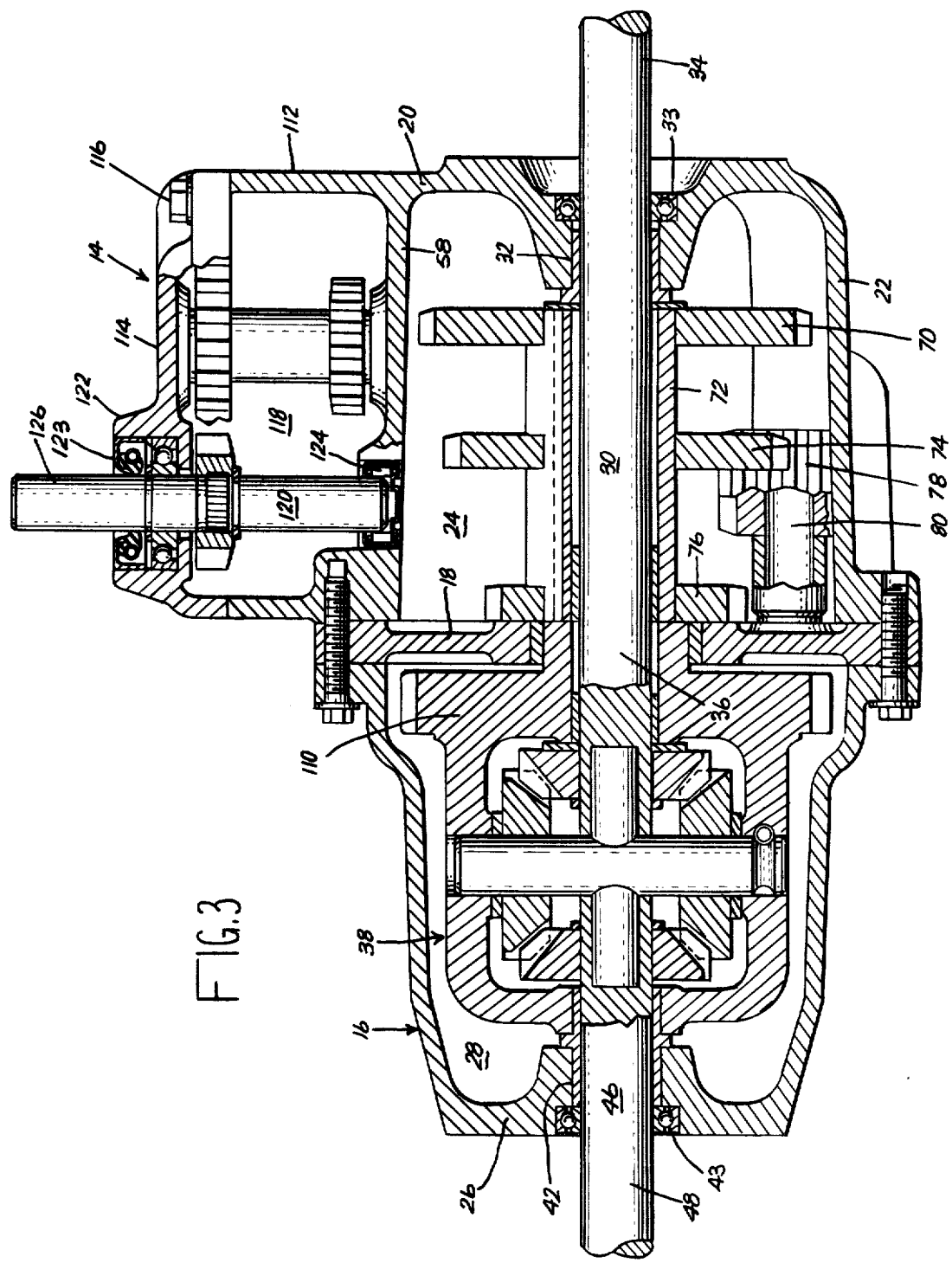
FIG. 3 is a longitudinal, cross-sectional view taken generally long the line 3—3 of FIG. 1.

Referring now to the figures of the drawing, the improved, dual range transaxle transmission of the invention, generally indicated at 10, comprises casing 12 having first and second sections 14, 16 joined by partition 18. Casing section 14 has end wall 20 and side wall 22 which, with partition 18, define compartment 24. Casing section 16 has end wall 26 and with partition 18 defines compartment 28.

Output shaft 30 is journalled in suitable bearing 32 in end wall 20 and has extension portion 34 extending outwardly therefrom through oil seal 33. Output shaft 30 extends across compartment 24, through partition 18, and has its end 36 coupled to differential 38 in compartment 28, as will be hereinafter described. Output shaft 40 coaxial with output shaft 30 is journalled in suitable bearing 42 in end wall 26 and has extension portion 44 extending outwardly therefrom through oil seal 43. Output shaft 40 extends into compartment 28 and is also coupled to differential 38, as will be hereinafter described.

Intermediate shaft 46 is journalled in suitable bearings 48, 49 in end wall 20 and casing section 16 and extends across compartment 24 parallel with output shaft 30. Conventional brake disc 50 is secured to extension 52 of intermediate shaft 46 which extends outwardly through oil seal 51.

Shaft 54, vertically disposed with respect to shafts 30 and 46, is journalled in suitable bearing 56 in top portion 58 of side wall 22 and has bevel gear 60 thereon in casing compartment 24. Bevel gear 60 serves as the input gear to change speed gearing 62 in casing compartment 24. Bevel gear 60 meshes with bevel gear 64 splined to sleeve 66 rotatably mounted on shaft 46, gear 68 being also splined to sleeve 66. Gear 68 is thus driven in unison with bevel gear 64 by input bevel gear 60.

Gear 68 meshes with and drives gear 70 mounted on sleeve 72 rotatably mounted on shaft 30. Gears 74, 76 are also mounted on sleeve 72, the cluster of gears 70, 74, 76 thus rotating in unison with respect to output shaft 30. Reverse gear 78 meshing with gear 74 is rotatably mounted on shaft 80 located in partition 18 and compartment 24.

Gear 82 is mounted on splines 84 on shaft 46 for axial movement between an inactive position, as shown in solid lines in FIG. 1, a position in mesh with gear 74, as shown in dashed lines at 86, and a position locked to splines 87 of sleeve 66, as shown in dashed lines at 88. Gear 82, when moved to position 88 to engage splines 87 of sleeve 66 provides the highest speed ratio for gear train 62, and when moved to mesh with gear 74 provides an intermediate speed. Gear 82 has annular notch 88 formed therein which receives shift fork 90.

Gear 92 is axially movable on splines 94 on shaft 46 from an inactive or neutral position as shown in solid lines in FIG. 1 to a position in mesh with gear 76, as shown in dashed lines at 96, and a position in mesh with reverse gear 78, as shown in dashed lines at 98. In position 96, gear 92 provides the lowest forward speed and in position 98, gear 92 provides the reverse drive. Gear 92 has notch 100 therein which receives shift fork 102.

Shift forks 90, 102 form a part of shift mechanism 104 actuated by manual shift lever 106. Shift mechanism 104 is more fully shown and described in U.S. Pat. No. 3,040,601 assigned to the assignee of the present application.

Gear 108 on intermediate shaft 46 drives cage 110 of differential 38 thereby to drive output shafts 30, 40. The mechanism thus far described essentially comprises the single range transaxle transmission previously manufactured by the assignee of the present application, shaft 54 being the input shaft.

In order to modify the above-described single range transaxle transmission for dual range operation, upstanding wall 112 is provided on upper portion 58 of side wall 22, and top wall 114 is attached thereto, as by threaded fasteners 116 to define another cavity 118. Input shaft 120 extends between top wall 114 and top wall portion 58, is journalled in suitable bearings 122, 124 respectively therein, and has extension portion 126 extending beyond top wall 114 through oil seal 123 for connection to a prime mover.

Intermediate shaft 54 also extends between top wall portion 58 and top wall 114 and is journalled in suitable bearings 56, 128, input shaft 120 and intermediate shaft 54 being parallel. Another intermediate shaft 130 extends between top wall portion 58 and top wall 114 parallel with intermediate shaft 54 to input shaft 120, and respectively journalled in suitable bearings 132, 134. Gear 136 on input shaft 120 meshes with gear 138 on intermediate shaft 130.

Gear cluster 140 comprising gears 142, 144 is mounted on splined portion 146 of intermediate shaft 54 for axial movement thereon between a first position with gear 142 in mesh with gear 138, as shown in dashed lines at 148, and a second position with gear 144 in mesh with gear 150 on intermediate shaft 130, as shown in dashed lines at 152. It will be seen that with gear cluster 140 in position 148, the high speed range is provided whereas, with gear cluster 140 in position 152, the low speed range is provided.

Gear cluster 140 has annular notch 154 formed therein between gears 142, 144 which receives shift fork 156. Shift fork 156 has end 158 seated in bushing 160 in lever member 162. Lever member 162 is mounted on pivot shaft 164 journalled in suitable bearing 166 in upstanding wall 112 and having end 168 extending therefrom. Actuating lever 170 actuates gear cluster 140 between its positions thereby to select the operating range of the transmission. Actuating lever 170 may be coupled by linkage (not shown) to a range selector on the dash of the tractor.

Shift lever 162 has detent notches 172, 174, 176 formed therein (FIG. 5) cooperating with spring-actuating detent ball 178 to establish neutral and high and low range positions for shift lever 162. Lever 162 also has neutral start notch 180 formed therein cooperating with ball 182 of switch mechanism 184 mounted on upstanding wall 112 to provide for starting the tractor only in the neutral position of shift lever 162.

It will now be seen that the invention provides a simple dual range transaxle transmission which, in the illustrated embodiment, provides six forward and two reverse speeds, and which employs many of the same component parts as a single range transaxle transmission.

While there have been described above the principles of this invention in connection with specific apparatus, it is to be clearly understood that this description is made only by way of example and not as a limitation to the scope of the invention.

What is claimed is:

1. In a transaxle transmission including a casing having side and opposite end walls, output shaft means for connection to a machine to be driven thereby, said output shaft means having axially aligned extensions respectively extending through said casing end walls, an input shaft extending through said casing side wall generally perpendicular with respect to said output shaft means, selectively actuable change speed gearing means in said casing drivingly connected to said output shaft means for selectively providing predetermined forward and reverse gear ratios, means for drivingly connecting said input shaft to said gearing means, and manually actuable means coupled to said gearing means for shifting the same to provide said predetermined ratios, the improvement wherein said connecting means includes gear ratio range selector means coupled between said input shaft and gearing means for selecting high and low ranges of ratios, said selector means including at least one intermediate shaft in said casing in spaced, parallel relationship with said input shaft, second means for drivingly connecting said intermediate shaft to said first-named gearing means, second selectively actuable change speed gearing means in said casing for drivingly connecting said input shaft to said intermediate shaft thereby to provide high and low speed reduction ratios between said input and intermediate shafts, and second manually actuable means coupled to said second change speed gearing means for shifting the same to provide said high and low ratios, said output shaft means including first and second output shafts in said casing respectively terminating in said extensions, said first-named gearing means including differential gearing connecting said first and second output shafts, a second intermediate shaft in spaced, parallel relationship with said output shafts, and selectively actuable change speed gearing on at least said second intermediate shaft and drivingly connected to said differential, said second connecting means including a first sleeve on said second intermediate shaft, and bevel gearing drivingly connecting said first-named intermediate shaft to said first sleeve, said change speed gearing including a second sleeve on one of said output shafts, gearing drivingly connecting said first and second sleeves, a cluster of at least two gears having different numbers of teeth on said second sleeve and rotatable therewith, a reverse gear driven by one gear of said cluster, a first change speed gear axially movable on said second intermediate shaft between a first position and a second position in engagement with one gear of said cluster, a second change speed gear axially movable on said second intermediate shaft between a first position and a second position in engagement with the other gear of said cluster, one of said change speed gears in its first position engaging said reverse gear, said differential including a cage, and gearing drivingly connecting said second intermediate shaft to said cage, said first-named manually actuable means including first and second elements in said casing for respectively moving said first and second change speed gears between the positions thereof, and a manual actuating element extending out of said casing.

2. The transmission of claim 1 wherein said casing includes another wall in spaced, parallel relationship with a portion of said side wall, joined thereto by an upstanding wall and dividing said casing into first and second compartments, said side wall portion and other wall defining said first compartment, and a second side wall portion defining said second compartment with said first-named side wall portion, said input and intermediate shafts being journalled in and extending between said first side wall portions and other wall, said intermediate shaft having a portion extending through said first side wall portion into said second compartment and having a part of said bevel gearing thereon, said second change speed gearing means including a third intermediate shaft in said first compartment journalled in and extending between said first side wall portion and other wall and in spaced, parallel relationship with said input shaft and first-named intermediate shaft, gearing in said first compartment drivingly connecting said input shaft to said third intermediate shaft, and a high and low range gear cluster in said first compartment slidably mounted on said first intermediate shaft for movement thereon between first and second positions and respectively selectively engageable with corresponding gears on said third intermediate shaft, said second manually actuable means including a shifting element in said first compartment coupled to said high and low range cluster for moving the same on said first intermediate shaft between said positions thereof, and a range selector element connected to said shifting element and extending through a said upstanding wall, said first-named gearing means being in said second compartment, said manual actuating element of said first-named manually actuable means extending through said second side wall portion.

3. The transmission of claim 2 wherein said range selector element includes a shaft pivotally mounted on said upstanding wall portion, a lever member in said first compartment connected to said shaft and operably coupled to said shifting element, and an operating member connected to said shaft exteriorly of said casing, said lever member having first and second detent notches therein on either side of a neutral detent notch, said lever member also having a neutral start notch formed therein, and further comprising a detent on said casing cooperating with said detent notches for establishing said first and second positions of said gear cluster and a neutral position thereof, and a switch-enabling element on said casing cooperating with said neutral start notch when said detent cooperates with said neutral detent notch.

* * * * *